Sept. 19, 1933.　　D. R. P. HEATON　　1,927,642
AUTOMOBILE HEADLIGHT
Filed Sept. 25, 1931　　3 Sheets-Sheet 1
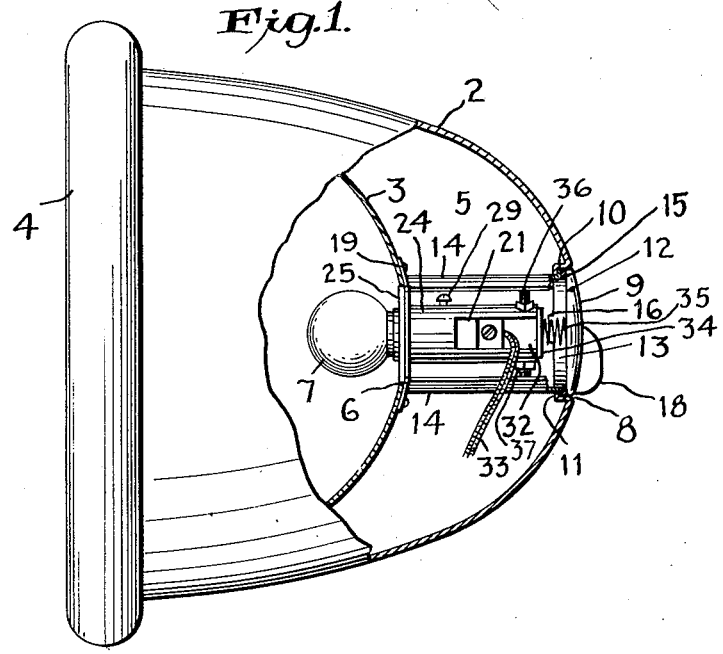
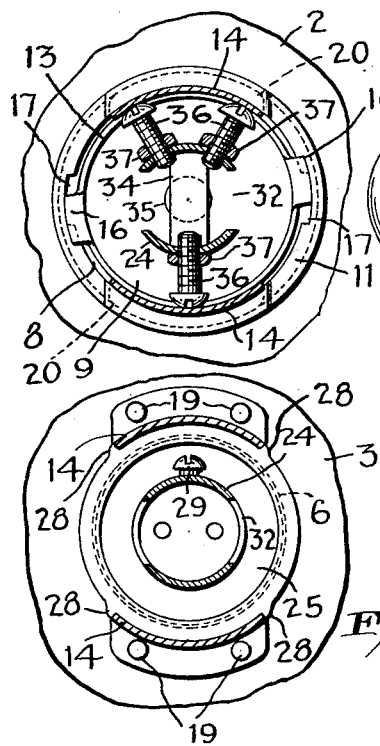
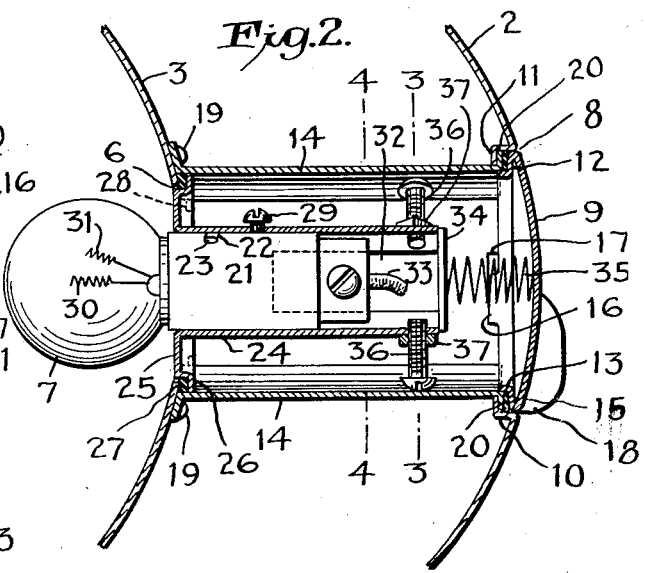
INVENTOR
D. R. Perry Heaton
BY
ATTORNEY

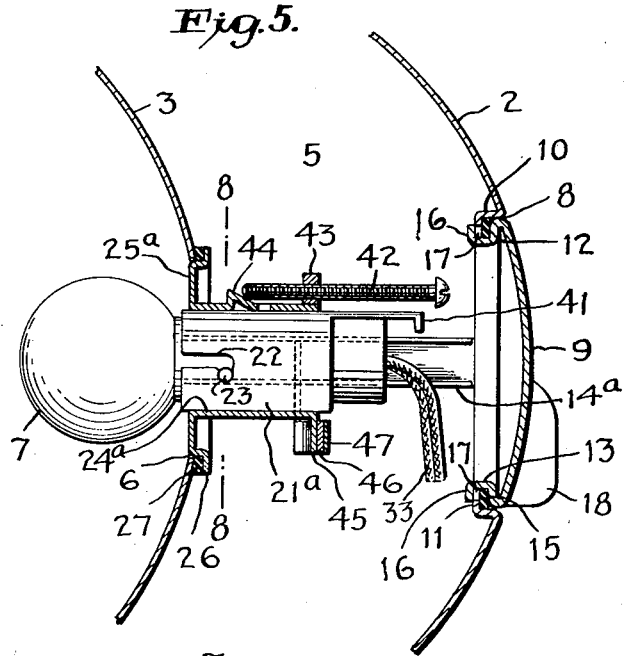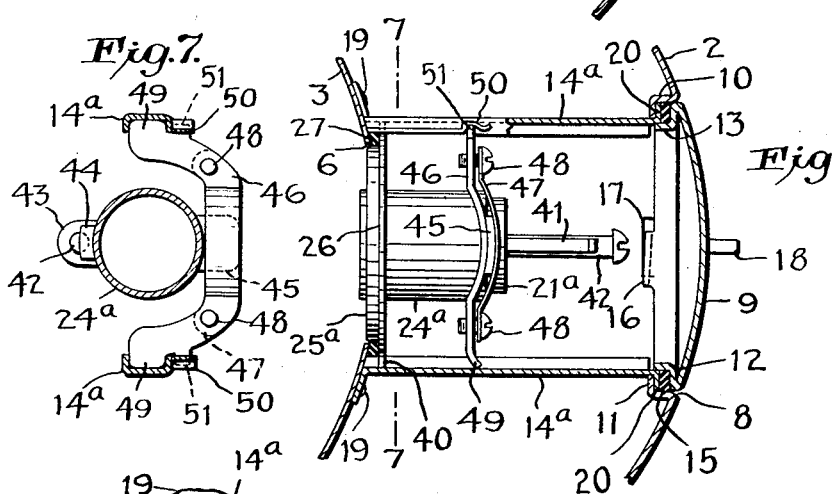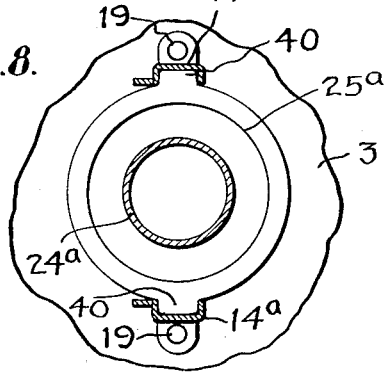

Sept. 19, 1933.     D. R. P. HEATON     1,927,642
AUTOMOBILE HEADLIGHT
Filed Sept. 25, 1931     3 Sheets-Sheet 3
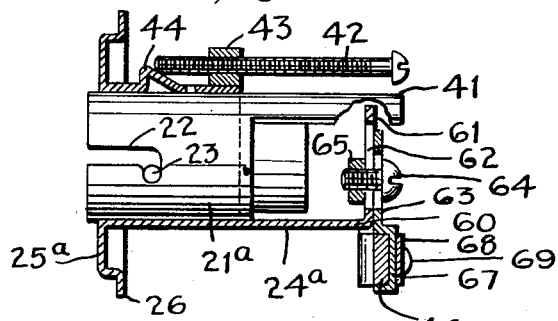
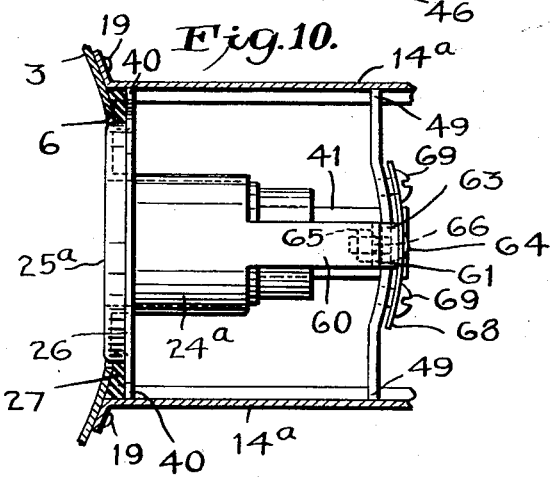
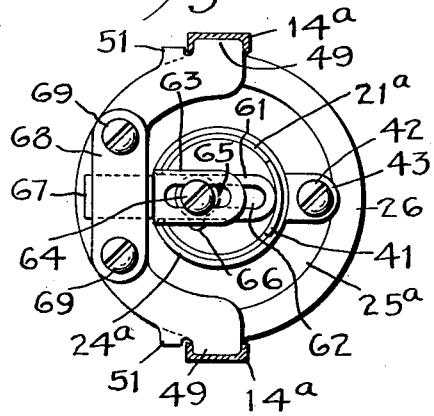
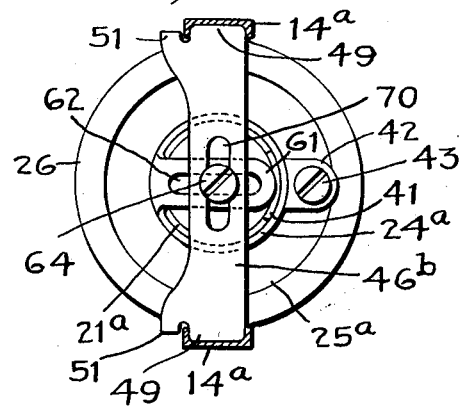

Patented Sept. 19, 1933

1,927,642

UNITED STATES PATENT OFFICE 1,927,642

AUTOMOBILE HEADLIGHT

Dwight R. Perry Heaton, Chappaqua, N. Y.

Application September 25, 1931
Serial No. 565,099

4 Claims. (Cl. 240—44.2)

The invention relates to electric lights for automobiles and more especially to the headlights. The invention is also applicable to searchlights, and features of the invention may be incorporated in parking lights for automobiles.

The type of lamp to which the invention relates is one having a parabolic or similarly shaped reflector, a shell which encloses the reflector and through which the electric wires are brought to the bulb socket at the center of the reflector, and a rim which holds the glass or lens to the front of the lamp. These rims are ordinarily difficult to remove, in consequence of which the laws requiring two lights showing at night in front of an automobile are often violated, notwithstanding that the danger of "one-eyed" cars is generally recognized. Constructions designed to facilitate removal of the rims, for the purpose of bulb replacement, are relatively expensive and usually require over-size rims. After a rim has been got off, at some risk of breaking the lens, the glistening reflector surface is exposed to injury by the elements, finger marks and cleaning with improper or gritty cloths.

An object of the present invention is to make it easy for the driver to change bulbs in such lamps, so that law violation, payments of fines and accidents may be reduced. Another object is to make rim-removal unnecessary except in case of breakage of the lens. Lens-breakage being relatively infrequent, the rim may be of any safe and inexpensive type that can be removed at a service station. Other items of expense introduced in various models of headlights because of the present necessity for taking off the rims in order to replace bulbs may likewise be eliminated.

More specifically, the object of the invention is to provide a device for removing the socket and the bulb through the back of the headlight, the device also affording adjustments for the light-beam.

These adjustments include fore and aft adjustments of the socket and bulb, this being necessary for focusing. Another useful adjustment is a vertical angular adjustment to raise or lower the filament so as to regulate the height of the beam above the ground. Combined with this there may be a lateral angular adjustment to correct any lateral deviation of the beam. An adjustment of the socket and bulb about the longitudinal axis is desirable to bring the filaments into parallelism with the ground in case the filaments of the bulb should not be in accurate relation to the pegs on the stem, but this adjustment might be omitted by causing the socket to be non-turnable with respect to its support or holder.

The invention is susceptible of embodiment in numerous forms, certain of which are illustrated herein. The reflector is provided with a central opening large enough to let the bulb pass through it, and means are provided for closing the space between the bulb socket and the edge of this opening. The back of the shell also has an opening, this opening being sufficiently large to enable a holder for the bulb socket, together with the socket and bulb to be withdrawn completely from the shell. Easily removable means are provided for tightly closing this opening and completing, smoothly or ornamentally, the external contour of the shell.

The adjustment features are so devised as not to conflict with this rearward removability of the bulb and bulb socket and to enable the opening in the back of the shell to be kept comparatively small, and preferably to enable the adjustments to be made while the device remains in place in the lamp.

In the preferred forms of the invention, a guide or support is supported in the space between the reflector and the shell. A holder or carrier for the bulb socket is supported on or in this guide so that it can be moved into and out of the shell opening and into accurate relation to the reflector, means being provided to keep the holder with the socket and bulb in the forward position. A face plate on this holder fills out the opening in the reflector. It preferably also affords a front support cooperating with the guide and a means to keep the holder from turning about its axis.

The simplest way of securing the longitudinal or the turning adjustments of the bulb is by sliding or turning the socket in a barrel-like holder, means being provided for setting these adjustments when made, but the form of the holder or carrier may be varied and the construction may be such that the carrier or a part thereof may partake of the longitudinal adjustment. Angular adjustments, to raise or lower the bulb or to shift it to one side or the other in front of the reflector, are preferably secured by devices coacting between the holder and the guide and furnishing rear support.

In the accompanying drawings forming a part hereof:

Fig. 1 is a side view of a headlight embodying the invention, enough of the exterior being broken out to show the invention, parts in the interior being in elevation and portions of the reflector and shell being in section;

Fig. 2 is a side sectional elevational view on a larger scale of the internal construction;

Figs. 3 and 4 are cross-sections taken on the lines 3—3 and 4—4 of Fig. 2;

Fig. 5 is a sectional plan view illustrating another embodiment of the invention;

Fig. 6 is a sectional side elevation of Fig. 5, the upper guide element being shown partly in elevation and partly in vertical section;

Fig. 7 is a cross-section taken on the line 7—7 of Fig. 6, looking rearward;

Fig. 8 is a cross-section taken on the same line looking forward;

Fig. 9 is a sectional plan view illustrating another embodiment;

Fig. 10 is a sectional side elevation of Fig. 9;

Fig. 11 is a cross-sectional rear-end elevation of this form of the invention; and Fig. 12 is a view similar to Fig. 11, showing another modification.

The form of construction illustrated in Figs. 1 to 4 will now be described. The shell of the headlight is marked 2, the reflector in the interior of the shell is marked 3, and the rim is marked 4. Between the shell and the reflector there is the customary space 5, which is widest between the back central portions.

The central area of the reflector is cut out to form a circular opening 6, this opening being large enough to permit an ordinary incandescent bulb 7, such as used in these headlights, to be passed through it. The central area of the back of the shell is removed to provide a somewhat larger opening 8. This opening has a recessed seat to receive a flush cap 9, conforming with the contour of the shell. Such seat is preferably formed by bending the metal of the shell in a forward direction to form a recessed wall 10 and then bending it radially inward to form a ledge 11.

The cap 9 has a peripheral rim 12, which may be made by bending the metal of the cap, if the cap be of sheet metal, and is further provided with a cuff 13, which enters within a guide 14. A gasket 15, held on the cuff 13, is compressed between the rim 12 and the ledge 11 to create a water-tight joint when the cap is tightened.

Inclined lugs 16 project outward from the inner end of the cuff 13 in diametrically opposed relations. These lugs are entered and withdrawn through notches 17 cut in the ledge 11. The lugs having been so entered, the cap can be easily tightened by a short turn, causing the lugs to ride under the ledge 11 with a camming action. Turning of the cap in the reverse direction frees it. Other forms of quick detachable connections may be employed. The cap may be provided with a wing 18, or with any other sightly formation enabling it to be turned conveniently.

A guide or support 14 is shown as comprising two parallel, upper and lower, strips extending between the reflector and the shell at the region of the openings. These guide elements, which are shown as being transversely curved, might be replaced by a tube having openings in its sides. The forward ends of the guide elements are secured to the reflector by soldering or riveting, as at 19. Their rear ends receive support from the shell, to which they may or may not be permanently fastened. As illustrated, their rear ends are flanged out at 20, to lie in depressions pressed in the ledge 11, so that these flanges are flush with the ledge, leaving a continuous seat for the gasket 15. The ends of the guide elements thus engaged may be further secured by soldering.

The socket 21 for the bulb 7 is of a conventional type having bayonet slots 22 engaged by pegs 23 on the stem of the bulb. A holder, preferably in the form of a barrel 24, is provided for the reception of the socket. At the front the barrel is provided, integrally or otherwise, with an outwardly extending face plate 25, to close the annular space between the socket and the edge of the opening 6 in the reflector. The margin 26 of this face plate is offset rearwardly, so as to overlap the margin of the reflector surrounding the opening 6, and an elastic compressible washer 27 is interposed. The exposed portion of the plate 25 may be flat or curved to conform with the curvature of the reflector, and it may be finished with a bright reflecting surface if deemed necessary. The edge of the face plate is slidably guided in contact with the guide elements 14, and is formed with ears 28 coacting with the edges of these elements to prevent turning of the barrel or holder 24.

The socket 21 can be adjusted longitudinally and turnably in the barrel 24, and is held at the proper adjustment by a set-screw 29 threaded through the wall of the barrel to bear against the side of the socket. By moving the socket in or out in the barrel the filaments 30 and 31 can be placed at the proper focal distance in front of the reflector. The turning adjustment enables the filaments to be disposed parallel to the ground.

The rear portion of the socket holder extends beyond the rear end of the socket in this particular construction, and is cut away to afford ample openings 32 for connecting the electric conductors 33. The rear ends of the limbs of the holder may be bridged by a plate or bar 34, soldered or otherwise secured, to receive thrust of the spring 35 interposed between this plate and the cap 9 and fastened to one of them. This spring is an embodiment of means for keeping the holder 24 in its forward position with the face plate 25 properly seated against the reflector and the filaments of the bulb in definite relation to the reflecting surface.

Angular adjustment of the socket to raise or lower the filaments with respect to the reflector is secured in this construction by means of screws 36 threaded through the limbs of the holder 24, so that their heads will touch the inner surfaces of the upper and lower guide elements 14. There are preferably three of these screws, two being shown above and one below, and their adjustment may be made secure by lock-nuts 37. By screwing in the upper screws and screwing out the lower screw, the rear end of the holder 24 can be raised, with consequent depression of the bulb 7. By the reverse adjustment the bulb can be raised in relation to the focus of the reflector.

With this form of the invention bulb replacement and adjustment are effected in the following manner. The cap 9 is removed and the holder 24 with the socket 21, the bulb 7 and the adjusting devices 29 and 36 are drawn completely out of the shell through the guide 14 and the shell opening 8, the latter opening being large enough to permit all parts to pass, and the opening 6, as previously stated, being of sufficient size to allow the bulb 7 to pass. The bulb can now be changed, and the removable unit can be slipped back into the guide and up against the reflector, where it is held by the spring 35 when the cap 9 is replaced. When replacement has been made, the new bulb may be found to be in proper adjustment. If not, the entire movable assemblage is again removed and the slight necessary adjustment of the socket 21 in the holder 24, or of the screws 36, is made. It may be necessary to take out the unit a few times in order to complete the adjustment.

The form of construction shown in Figs. 5 to 8 is next described. Parts requiring no further description are given the same reference characters as in Figs. 1 to 4. In this instance the supporting or guiding elements 14ᵃ are shown as having the form of channels, and the face plate 25ᵃ of the barrel 24ᵃ has ears 40 for guidance and support of these channels.

An advantage of this form of the invention, which is also assured by other embodiments to be described, is that the adjustments can be made while the removable unit remains in position in the headlight, so that the adjustment of the bulb can be effected more quickly and readily. The barrel 24ᵃ is short, so that the longitudinal and turning adjustments of the socket and bulb can be made by inserting the fingers through the shell opening 8 and manipulating the insulation of the socket 21ᵃ which projects beyond the barrel; or to facilitate this adjustment the casing of the socket may be provided with a rearwardly extending handle 41.

This adjustment, or these adjustments, when made, are set or locked by means of a longitudinal screw 42, which is threaded through a lug 43, soldered or otherwise united with the barrel. The rear end of this screw is accessible to a screwdriver introduced through the opening in the back of the shell. The forward end of this screw bears against an inclined tongue 44, cut and bent from the wall of the barrel, so that when the screw is advanced the end of the tongue is forced inward against the side of the socket.

In this form of the invention rear support of the movable unit in the guide and vertical angular adjustability are secured in the following manner:

The holder 24ᵃ has a laterally projecting tongue 45 which is clamped between a C-bar 46 and a clamp piece 47, these being drawn together by screws 48. The bow shape of the C-bar enables it to be disposed at one side of the socket 21ᵃ, in front of the rear end of the socket. Its upper and lower ends 49 are formed to fit slidably in the channels of the guide rails 14ᵃ. In order to avoid the necessity for great accuracy in manufacture, these tips may be bent as shown at the bottom in Fig. 6.

The C-bar thus clamped to the barrel forms a part of the socket-holder, and it is preferably utilized to cooperate with yieldable spring catches 50 on the sides of the rails to hold the removable unit in its forward or seated position. Low projections 51 on the C-bar adjacent its ends may be used to cooperate with these catches 50, which automatically engage and hold the C-bar. Thus the entire removable unit, when it is pushed home, is held in place by spring catches 50; these spring catches are designed to automatically yield to a sufficient pull when the unit is to be extracted from the headlight.

The screws 48 are spaced apart sufficiently to allow for a range of vertical movement of the tongue 45 relative to the C-bar, when the screws are loosened. In this way, the adjustment of the bulb to raise or lower the light-beam is obtained. For better accommodation to this adjustment, the tongue 45, the central part of the C-bar and the central part of the clamp piece 47 may be formed on a curvature in edge view, as illustrated in Fig. 6.

The construction employed in the embodiment just described is applicable to headlights having different depths of the space between the back of the reflector and the back of the shell. The location of the C-bar alongside the socket enables the construction to be applied to lamps having very small spacings between the shell and reflector. For short models, the rearwardly projecting handle 41 can be omitted, and the screw 42 can be shortened as much as necessary.

Figs. 9-11 illustrate a construction generally similar to the one illustrated in Figs. 5-8, though in this instance the C-bar 46 is in rear of the socket 21ᵃ. The barrel 24ᵃ has a rearward extension 60 at one side, and this extension is bent inward behind the bulb socket to form a tongue 61 having a horizontal slot 62. Another horizontally slotted piece 63 is slidable right or left on the tongue when an adjustment screw 64 is loosened. This screw passes through the slots of the elements 61, 63 into a nut 65 behind the tongue. This nut may be provided with a bent lip 66 to engage the side of the tongue and keep it from turning.

The outer portion 67 of the transverse adjustment piece 63 may be bent to overlie the central portion of the C-bar and to embrace its edges, and this portion 67 is shown clamped between the C-bar and a clamp piece 68, the latter being secured to the C-bar by screws 69 threaded into the C-bar. When these screws are loosened, the rear end of the socket-holder 24ᵃ can be tilted up or down to raise or lower the bulb is front of the reflector and thereby depress or elevate the light-beam. On loosening the screw 64, the socket-holder can be angularly adjusted in the horizontal plane to rectify any outward or inward deviation of the light-beam.

In Fig. 12, which shows a construction similar in most respects to that just described, the vertical and horizontal angular adjustments are secured in a somewhat simpler fashion by using a straight bar 46ᵇ in place of the C-bar 46, this bar having a vertical slot 70, and a single screw 64 serving to hold both the vertical and the horizontal adjustments permitted by the slots 62 and 70.

I claim:

1. A lamp having, in combination, a shell, a reflector within the shell and spaced from it, a guide supported between the reflector and the shell, a bulb, a bulb socket, a holder for the bulb socket movable on said guide and into and out of the lamp through the back of the shell, said reflector having an opening adequate for transit of the bulb and said shell having an opening, provided with a tight closure, through which the holder with the socket and bulb can be completely withdrawn, a face plate on the holder adapted to fill out the opening in the reflector and to cooperate with the guide, a rear member cooperating with the guide, and an adjustable connection between the holder and said rear member enabling the holder to be angularly adjusted in relation to the guide.

2. A lamp having, in combination, a shell, a reflector within the shell and spaced from it, a guide supported between the reflector and the shell, a bulb, a bulb socket, a holder for the bulb socket movable on said guide and into and out of the lamp through the back of the shell, said reflector having an opening adequate for transit of the bulb and said shell having an opening, provided with a tight closure, through which the holder with the socket and bulb can be completely withdrawn, a face plate on the holder adapted to fill out the opening in the reflector and to cooperate with the guide, a rear member cooperating with the guide, and means of adjustable connection between the holder and said rear member enabling the holder to be angularly adjusted both vertically and laterally in relation to the guide.

3. A lamp having, in combination, a shell, a reflector within the shell and spaced from it, parallel guide elements supported between the shell and the reflector, a bulb, a bulb socket, a holder for the bulb movable into and out of the lamp through the back of the shell, the reflector having an opening adequate for transit of the bulb and the shell having an opening, provided with a tight closure, through which the holder with the socket and bulb can be completely withdrawn, a face plate on said holder to fill out the opening in the reflector, said face plate constituting a front support guided in said guide elements and having means engaging the guide elements to prevent turning, a rear support guided in said guide elements, and an adjustable connection between said rear support and the holder enabling the holder to be adjusted angularly relatively to the guide elements.

4. A lamp having, in combination, a shell, a reflector within the shell and spaced from it, parallel guide elements supported between the shell and the reflector, a bulb, a bulb socket, a holder for the bulb movable into and out of the lamp through the back of the shell, the reflector having an opening adequate for transit of the bulb and the shell having an opening, provided with a tight closure, through which the holder with the socket and bulb can be completely withdrawn, a face plate on said holder to fill out the opening in the reflector, said face plate constituting a front support guided in said guide elements and having means engaging the guide elements to prevent turning, a rear support guided in said guide elements, an adjustable connection between said rear support and the holder enabling the holder to be adjusted angularly relatively to the guide elements, and catches on the guide elements in position to engage said rear support to retain the holder in its forward position.

D. R. PERRY HEATON.